US011768813B1

(12) United States Patent
Shah et al.

(10) Patent No.: US 11,768,813 B1
(45) Date of Patent: Sep. 26, 2023

(54) DATA MIGRATION FRAMEWORK

(71) Applicant: Intuit Inc., Mountain View, CA (US)

(72) Inventors: Smit Shah, Fremont, CA (US);
Raymond Chan, San Diego, CA (US);
Suresh Muthu, Los Altos, CA (US);
Snezana Sahter, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/958,186

(22) Filed: Sep. 30, 2022

(51) Int. Cl.
*G06F 15/16* (2006.01)
*G06F 16/21* (2019.01)
*G06Q 10/067* (2023.01)

(52) U.S. Cl.
CPC ......... *G06F 16/211* (2019.01); *G06Q 10/067* (2013.01)

(58) Field of Classification Search
None
See application file for complete search history.

(56) References Cited

U.S. PATENT DOCUMENTS

| 10,228,969 B1* | 3/2019 | Gupta | G06F 9/541 |
| 10,963,435 B1* | 3/2021 | McAlister | G06F 11/0766 |
| 2014/0046917 A1* | 2/2014 | Smith | G06F 16/2379 707/696 |
| 2014/0379636 A1* | 12/2014 | Lober | G06F 16/258 707/610 |
| 2018/0157697 A1* | 6/2018 | Brown | G06F 16/128 |
| 2019/0235918 A1* | 8/2019 | Liu | G06F 3/0617 |
| 2019/0377490 A1* | 12/2019 | Hallak | G06F 3/0607 |

OTHER PUBLICATIONS

Oracle Fusion Middleware, "Understanding Oracle GoldenGate", Sep. 1, 2018 (37 pages).
"AWS Database Migration Service User Guide", Amazon Web Services, Jan. 1, 2022 (692 pages).
Elman, D., "Guidebook: Understanding the Value of Migrating from On-Premises to AWS for Application Security and Performance", Nucleus Research, Jan. 1, 2020 (12 pages).

* cited by examiner

*Primary Examiner* — Alex Gofman
(74) *Attorney, Agent, or Firm* — Ferguson Braswell Fraser Kubasta PC (57) ABSTRACT

A method may include selecting a cohort of entities for migration from a source storage repository to a target storage repository, obtaining a mapping between a source storage schema of the source storage repository to a target storage schema of the target storage repository, and migrating data for the entities in the cohort. Migrating the data of an entity may include copying, without locking the data in the source storage repository and in the target storage repository, the data from the source storage repository to the target storage repository, verifying, while the data is locked, that the data in the source storage repository is the same as the data in the target storage repository, changing, while the data in the source storage repository and the target storage repository is locked, an entity pointer for the entity to the target storage repository based on the verifying, and unlocking the data.

19 Claims, 7 Drawing Sheets

DATA MIGRATION FRAMEWORK

BACKGROUND

As different computer technologies become outdated, companies may migrate computing systems away from the older technologies to new computer technologies. One aspect of the migration is the migration of data from a source storage system to a target storage system. In many cases, the migration should occur with minimum downtime. Namely, data migration is complex when entities that have the data would like to access the data without downtime. The data migration may be made more difficult when the company has hundreds of thousands of entities to migrate and each of these entities would be associated with multiple product offerings. The goal of data migration is to have successfully transferred the data such that the computing system may use the target storage system and phase out the source storage system.

SUMMARY

In general, in one aspect, a method may include selecting, from multiple cohorts of entities, a cohort of entities for migration from a source storage repository to a target storage repository. The method may also include obtaining a mapping between a source storage schema of the source storage repository to a target storage schema of the target storage repository. The method may furthermore include migrating data for the entities in the cohort. Migrating the data of an entity may include copying, without locking the data in the source storage repository, the data from the source storage repository to the target storage repository, verifying, while the data in the source storage repository and the target storage repository is locked, that the data in the source storage repository is the same as the data in the target storage repository, changing, while the data in the source storage repository and the target storage repository is locked, an entity pointer for the entity to the target storage repository based on the verifying, and unlocking the data in the source storage repository and the target storage repository, where, based on the entity pointer, the data in the target storage repository is accessed after migrating.

In general, in one aspect, system may include a migration repository. System may also include a computer processor. System may furthermore include a migration service for executing on the computer processor, the migration service having a scheduler for selecting, from multiple cohorts of entities, a cohort of entities for migration from a source storage repository to a target storage repository, and scheduling a job to migrate the cohort. System may in addition include a job manager for executing the job. Executing the job may include obtaining a mapping between a source storage schema of the source storage repository to a target storage schema of the target storage repository, and migrating data for the entities in the cohort. Migrating the data of an entity may include copying, without locking the data in the source storage repository, the data from the source storage repository to the target storage repository, verifying, while the data in the source storage repository and the target storage repository is locked, that the data in the source storage repository is the same as the data in the target storage repository, changing, while the data in the source storage repository and the target storage repository is locked, an entity pointer for the entity to the target storage repository based on the verifying, and unlocking the data in the source storage repository and the target storage repository, where, based on the entity pointer, the data in the target storage repository is accessed after migrating.

In general, in one aspect, method may include partitioning multiple entities into multiple cohorts. Method may also include migrating each cohort of the cohorts individually, where migrating a cohort may include migrating the data for the entities in the cohort. Migrating the data of an entity may include copying, without locking the data in the source storage repository, the data from the source storage repository to the target storage repository, verifying, while the data in the source storage repository and the target storage repository is locked, that the data in the source storage repository is the same as the data in the target storage repository, changing, while the data in the source storage repository and the target storage repository is locked, an entity pointer for the entity to the target storage repository based on the verifying, and unlocking the data in the source storage repository and the target storage repository, where, based on the entity pointer, the data in the target storage repository is accessed after migrating.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to live data migration that can handle hundreds of thousands of entities with minimal downtime to users. An entity is a business entity, organization, family, or individual that has at least one account in the source storage system. The data migration is performed by partitioning entities into cohorts based on usage attributes by the entities of the source storage system. Data of the cohorts are then migrated individually from the source storage system to the target storage system. Specifically, the data is copied on an entity basis. During migration of an entity, while the data in the source storage system, the data is copied from the source storage system to the target storage system. After copying, the source storage system and the target storage system are locked. While locked, the data in the target storage system is verified to confirm that the data matches the source storage system. If verified, then an entity pointer for the entity is redirected to reference the target storage system and the account is unlocked. An additional verification may optionally be performed after unlocking the account. The process repeats for each entity in the cohort. When complete, the migration transitions to the next cohort.

By performing the process described above and in the following sections, the system is able to handle a large scale migration over time without minimal downtime for individual entities. Further, by migrating on the entity level rather than the table level of data, conflicting data is not overwritten. For example, on the source storage system, an entity may have data in multiple tables that conflict (e.g., use the same naming scheme, but have different values). When migration is performed on the table level, then the values of a second table may overwrite the values of the first table for the same entity on the target storage system resulting in data loss. However, by migrating at the entity level, one or more embodiments may build a complex entity that spans multiple tables and accounts for the conflicting values through naming schemes. The complex entity may then be copied to the target system.

Figure 1:
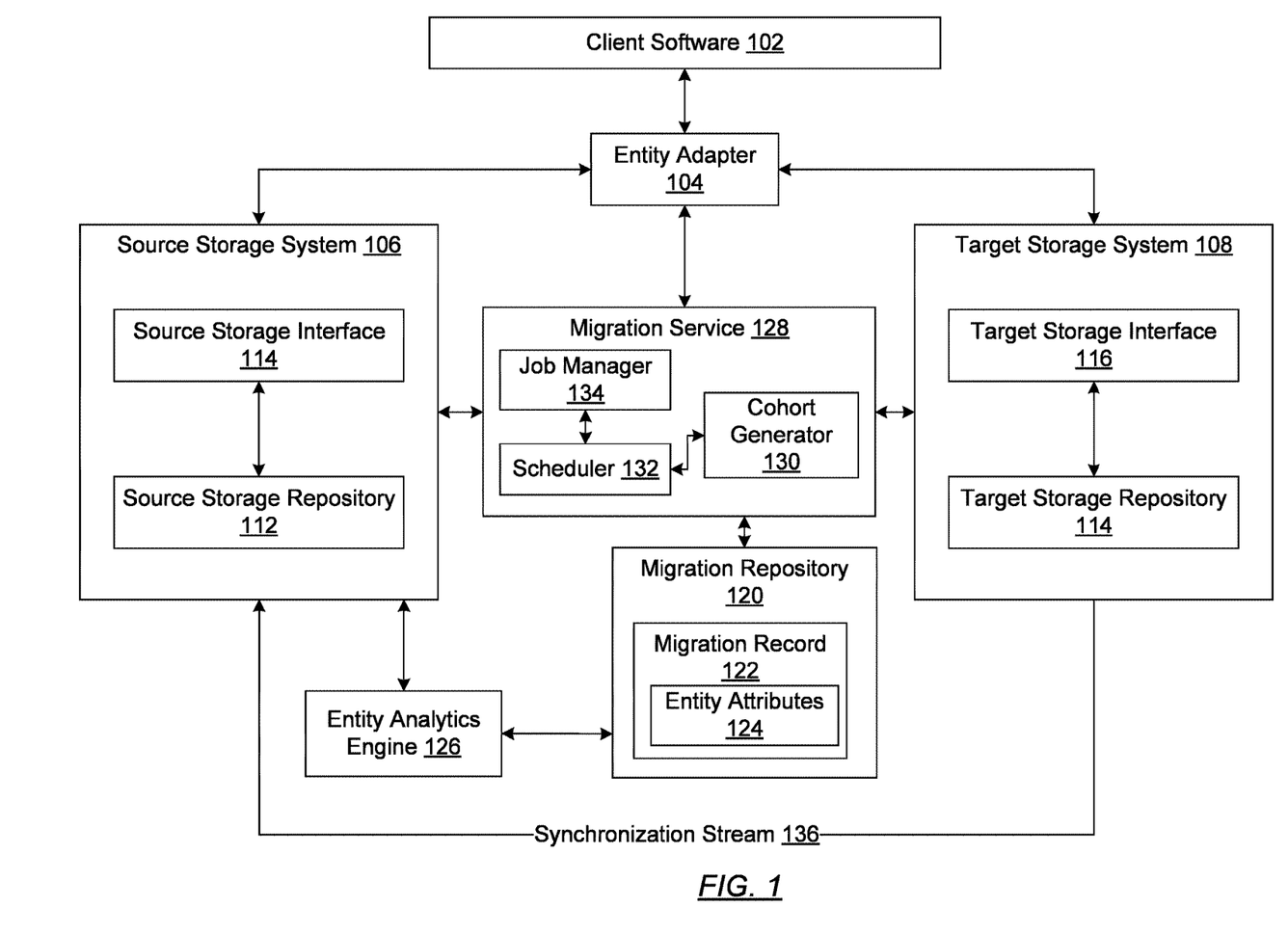
FIG. 1 shows a system in accordance with one or more embodiments

Turning to the figures, FIG. 1 shows a diagram of a system in accordance with one or more embodiments. As shown in FIG. 1, the system includes client software (102), a source storage system (106), and a target storage system (108). The client software (102) is software that stores and retrieves data from the storage systems (e.g., source storage system (106), target storage system (108)) to perform operations for an entity. As such, the client software (102) is a client of the storage systems. The client software (102) interfaces with users associated with the entity and provides functionality to the entity. For example, the client software (102) may include an enterprise application, a web application, a locally executing application, a software service, a widget, or other type of client. Further, multiple different types of client software (102) may exist and access the storage systems. For example, the system may include multiple types of software applications, each having various functionality. The multiple software applications may be different versions and/or editions of the same software product for different entities. As another example, the client software (102) may include completely different applications that provide various functionality to a same entity. Similarly, the client software (102) may include widgets embedded in applications or devices that perform operations for an entity. Specific examples of client software include financial management software, healthcare software, word processing and spreadsheet software, services, firewalls, analytic services, and other types of applications, widgets, and services.

The client software (102) interfaces with entities. An entity is something that has a real-world existence. For example, an entity may be a corporate entity, an organization, a family, a small business, an individual person, or other type of real-world thing. An entity may have one or more associated users. A user is a person who is authorized to access the data of the entity through the client software (102). Entities may have the same account or different accounts for the different client software. As such an identity server and/or account server (not shown) may perform identity and account management for the entity.

Continuing with FIG. 1, the storage systems (e.g., source storage system (106), target storage system (108)) are systems that physically store and retrieve data. A storage system (e.g., source storage system (106), target storage system (108)) includes a storage repository (e.g., source storage repository (110), target storage repository (112)) and a storage interface ((e.g., source storage interface (114), target storage interface (116))). In one or more embodiments of the invention, the storage repository (e.g., source storage repository (110), target storage repository (112)) is any type of storage unit and/or device (e.g., a file system, database, data structure, or any other storage mechanism) that stores data.

Further, the same storage repository (e.g., source storage repository (110), target storage repository (112)) may include multiple different, potentially heterogeneous, storage units and/or devices. For example, the same storage repository (e.g., source storage repository (110), target storage repository (112)) may be a database that includes multiple tables, whereby different tables or sets of tables are for different types of client software.

Further, in some embodiments, the storage repository (e.g., source storage repository (110), target storage repository (112)) includes geographically distributed storage units. A storage unit may be a device, such as a storage server, or a virtual storage on a device. Geographically distributed storage units have a data consistency challenge due to latency of propagating updates from one storage unit to another storage unit. For example, one storage unit of the storage repository may be located on the East Coast of the United States while another storage repository may be located on the West Coast of the United States. As another example, the various storage units of the storage repository may be located in various countries.

The storage interface (e.g., source storage interface (114), target storage interface (116)) is an interface to the storage system (106) that is configured to store and retrieve the data. The storage interface (source storage interface (114), target storage interface (116)) provides an abstraction layer between the schema and location of data in the respective storage repository and the client software. Thus, the storage interface obfuscates the underlying storage from the client software.

The source storage system (106) is the source of the data from which the data is being migrated. The target storage system (108) is the storage system to which the data is migrated. Thus, the source storage system is the source of the data, and the target storage system is the target of the data. For example, the source storage system (106) may be an outdated storage system and the target storage system (108) may be a new storage system. In one or more embodiments, the source storage system (106) may have a different schema than the target storage system (108). Further, the source storage system (106) may be an entirely different storage system than the target storage system. For example, the source storage system may be a SQL database while the target storage system is a no-SQL data base. A SQL database is a relational database while a no-SQL database stores key-value pairs.

Continuing with FIG. 1, the client software (102) and storage repositories (e.g., source storage repository (106), target storage repository (106)) is connected to an entity adapter (104). The connection may be a logical connection, such as through references, and/or a network connection, whereby the entity adapter transmits requests and receives responses. For example, the entity adapter (104) may act as an intermediary between the client software and the storage systems. As another example, the entity adapter (104) may respond to requests from the client software and the storage systems may communicate directly with the respective storage systems.

The entity adapter (104) includes functionality to maintain, for each entity, an entity pointer that references whether to use the target storage system or the source storage system to process input output requests for data. A pointer is a stored identifier associated with the entity that identifies the target or source storage system. Prior to migration of an entity, the entity pointer references the source storage system and after successful migration, the entity pointer references the target storage system for the entity. The entity adapter (104)

maintains at least one individual entity pointer for each entity. If an entity has multiple accounts, the entity adapter may include an entity pointer for each account.

A migration repository (120) is a storage repository for storing migration records (122). An individual migration record (122) exists for each entity and stores information used to manage the migration of the corresponding entity. In one or more embodiments, the migration record (122) does not include (i.e., omits) personal identifiable information (PII) data of the entity. Rather, the entity is only identified by an internal entity identifier. The internal entity identifier is a unique identifier of the entity that is internal to the storage systems, the migration repository (120), the entity analytics engine (126), and the migration service (128). The internal entity identifier is a unique identifier of the entity and, thereby uniquely identifies the migration record.

For an entity, the migration record (122) includes entity attributes (124). The entity attributes include the internal entity identifier, the usage attributes, and migration status attributes. The usage attributes are attributes describing the usage of the account of the entity on the source storage repository (106). For example, the usage attributes may identify the client software (102) that the entity uses to access the account, the last usage of the entity's account, the creation date of the entity account, and other metadata describing the entity account usage on the source storage system. The migration status attributes include attributes describing the status of the migration. For example, the migration status attributes may include information identifying the cohort to which the entity is assigned, whether migration is complete or incomplete, a timestamp of performing the migration, whether an attempt to migrate are successful or failure, a listing of error codes that occur when an attempt results in failure, and other migration information. In one or more embodiments, outside of the particular software that is being used and the internal entity identifier, the migration record only includes metadata about the entity's access to the account and migration. The migration record omits the underlying entity data that is stored for the entity. Stated another way, the migration record omits the data being migrated.

The entity analytics engine (126) is interposed between the source storage system (106) and the migration repository (120). The entity analytics engine (126) is configured to populate the migration repository (12). The operations of the entity analytics engine (126) is presented in FIG. 2 and discussed below. Generally, the entity analytics engine (126) is configured to query the source storage system (106), perform analytics, and add attributes to the migration repository (120).

A migration repository (120) is connected to the migration service (128). The migration service (128) is software configured to migrate data in the source storage system (106) to the target storage system (108). In one or more embodiments, the migration service (128) is an offline migration service. The migration service (128) includes a cohort generator (130), a scheduler (132), and a job manager (134). The cohort generator (130) is configured to analyze the usage attributes and generate cohorts of entities. A cohort is a group of entities that may be migrated together. Cohorts are defined based on having a common set of entity attributes. For example, two or more of the usage attributes may be the same or in the same range for entities in a cohort, thereby causing the entities to be grouped in a cohort.

The scheduler (132) is configured to schedule a job to migrate a cohort. The job manager (134) is configured to manage execution of the job to migrate the cohort. For example, the job manager (134) may assign the migration of entities of the cohorts to individual threads that perform the migration. The job manager (134) may further detect completion of the job and update the entity adapter (104) and the migration repository (120).

After the completion of the migration, the system of FIG. 1 may be configured to allow for rollback capability to roll back the change to the use of the source storage system (106) instead of the target storage system (108). The rollback functionality may be achieved through a synchronization stream (136). The synchronization stream (136) is a data stream of updates the source storage system (106) with the changes made to the target storage system (108).

While FIG. 1 shows a configuration of components, other configurations may be used without departing from the scope of the invention. For example, various components may be combined to create a single component. As another example, the functionality performed by a single component may be performed by two or more components.

FIGS. 2-5 show flowcharts for migration in accordance with one or more embodiments. While the various steps in this flowchart are presented and described sequentially, at least some of the steps may be executed in different orders, may be combined, or omitted, and at least some of the steps may be executed in parallel. Furthermore, the steps may be performed actively or passively.

Figure 2:
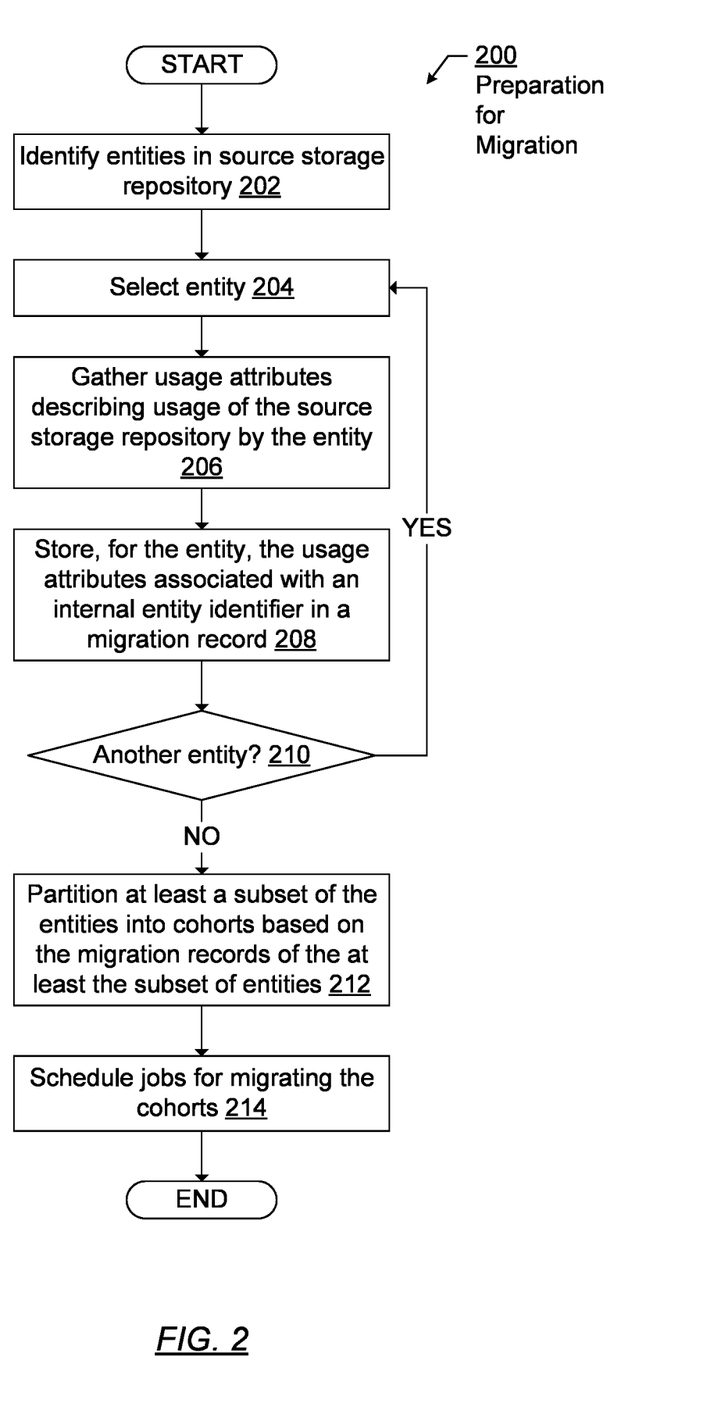
FIG. 2 shows a flowchart for preparation of migration in accordance with one or more embodiments.

FIG. 2 shows a flowchart for preparation of migration (200) in accordance with one or more embodiments. The first part of FIG. 2 may be performed, for example, by the entity analytics engine described above in FIG. 1. In some embodiments, the entity analytics engine may perform the operation by transmitting queries through the source storage interface or directly to the source storage repository. In Block 202, the entities in the source storage repository are identified. In Block 204, an entity is selected. In Block 206, usage attributes describing usage of the source storage repository by the entity are identified. The entity analytics engine does not query the underlying data that the client software manages for the entity. Rather, the entity analytics engine queries identity data, product data for the entity that identifies edition and version of the client software, log records describing usage, and other such information to obtain usage attributes for the entity. In Block 208, the usage attributes for an entity are stored in a migration record having the internal entity identifier of the entity. The usage attributes are stored in the migration repository.

The entity analytics engine may further obtain and store usage information for individual users associated with the entity. For example, when the entity is a company or organization with multiple users (e.g., employees or members with their own data and usage information), the operations of FIG. 2 may recursively obtain the records for each user. The migration record for the entity may reference the migration records for users of the entity.

In Block 210, a determination is made to determine whether to migrate another entity. If another entity exists, the process repeats with Block 204 to generate migration records for other entities. When at least a portion of the migration records are generated, the migration records may be used to generate cohorts by the cohort generator in FIG. 1.

In Block 212, at least a subset of the entities are partitioned into cohorts based on the corresponding migration records. The corresponding migration records are the migration records of the at least the subset of entities. Prior to identifying cohorts, filtering may be performed to remove entities that should not be migrated. For example, entities with a last login date that exceeds a threshold amount of time (e.g., five or ten years) may be excluded from migration. Other filtering may be performed to remove entities that should not be migrated. A hierarchy of attributes may be used to partition the entities into cohorts. For example, a first level of the partitioning may be based on whether the entity is a test entity. Test entities are entities that allow for or request early release. A second level may be based on last logon by the entity. A third level may be based on a set of one or more client software used by the entity. The attribute used for each branch of the hierarchy may be the same or different as the other branches at the same level. With each level of the hierarchy of attributes, partitions of entities are further partitioned into sub-partitions. Once the partitioning based on attributes is complete, the most granular level of partitioning (i.e., after applying all the partition criteria along a branch) is an individual cohort.

In Block 214, the scheduler schedules jobs for migrating cohorts in accordance with one or more embodiments. The migration job may be scheduled for off-peak usage hours for a particular cohort. The scheduler further separates the migration of cohorts so that two cohorts are not migrated at the same time. Further, the scheduler may order the cohorts according to the attributes of the cohorts. For example, cohorts that are test entities may be migrated prior to other cohorts. Other basis for scheduling cohorts may be used.

At the scheduled time for the job, the migration job is executed.

Figure 3:
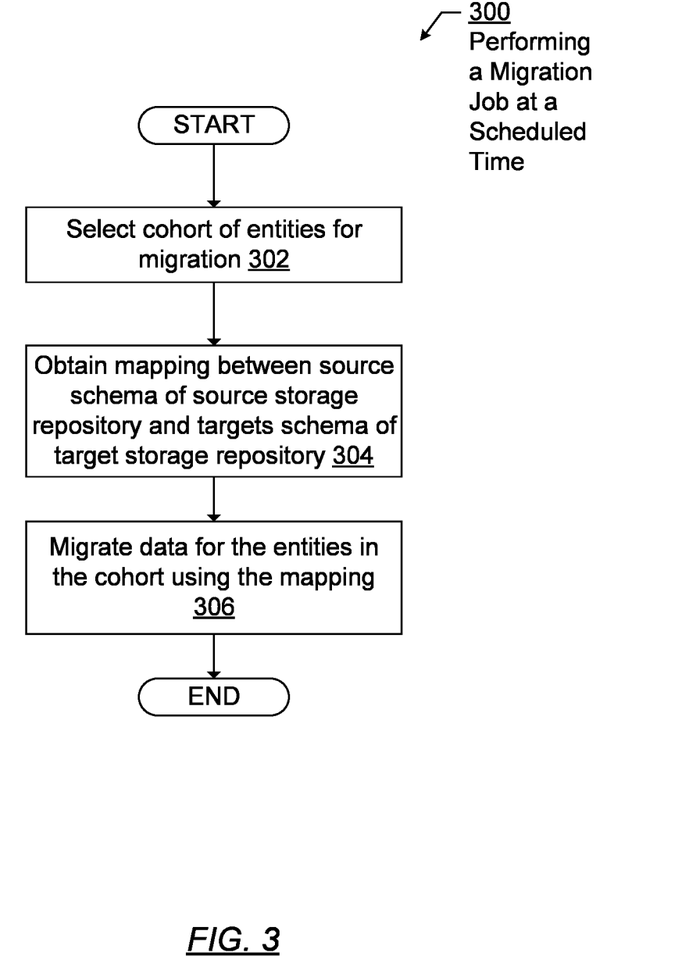
FIG. 3 shows a flowchart for performing a migration job at a scheduled time in accordance with one or more embodiments.

FIG. 3 shows a flowchart for performing a migration job at a scheduled time (300) in accordance with one or more embodiments. In Block 302, a cohort of entities are selected for migration. The scheduler determines that the scheduled time for executing the migration job occurred. Thus, the schedule triggers the execution of the job on the job manager. If the cohort has more than a threshold number of entities or is otherwise greater than a threshold size, then the cohort may be further partitioned into groups. The partitioning into groups may be based, for example, on a random selection or otherwise arbitrary selection. For example, the partitioning may be based on ranges of internal entity identifiers. Thus, a cohort that has hundreds of thousands of entities may be broken down into thousands of entities.

To execute a migration job, the job manager may trigger execution of multiple threads to execute concurrently. Each thread may independently migrate a cohort.

In Block 304, a mapping between a source schema of the source storage repository and a target schema of the target storage repository is obtained. The mapping may be obtained, for example, from storage. In one or more embodiments, the mapping accounts for possible conflicts between tables.

In Block 306, the data for the entities in the cohort are migrated using the mapping. Each entity is migrated independently of other entities. Namely, the migration is performed on a per entity basis rather than on a per table basis. More than one entity may be migrated concurrently, and possibly by the same thread. Migrating an entity or rather migrating the data of the entity is presented in FIG. 4.

After migration, updates to the target storage repository for the entity is transmitted back in the form of a synchronization stream to the source storage repository. The target storage repository may log updates to data in the target storage repository. An adapter (not shown in FIG. 1) may reverse map the updates to match the scheme of the source storage repository and generate a synchronization stream. The synchronization stream may be continually transmitted (e.g., as new updates are received at the target storage) or may be transmitted at set times or intervals.

Figure 4:
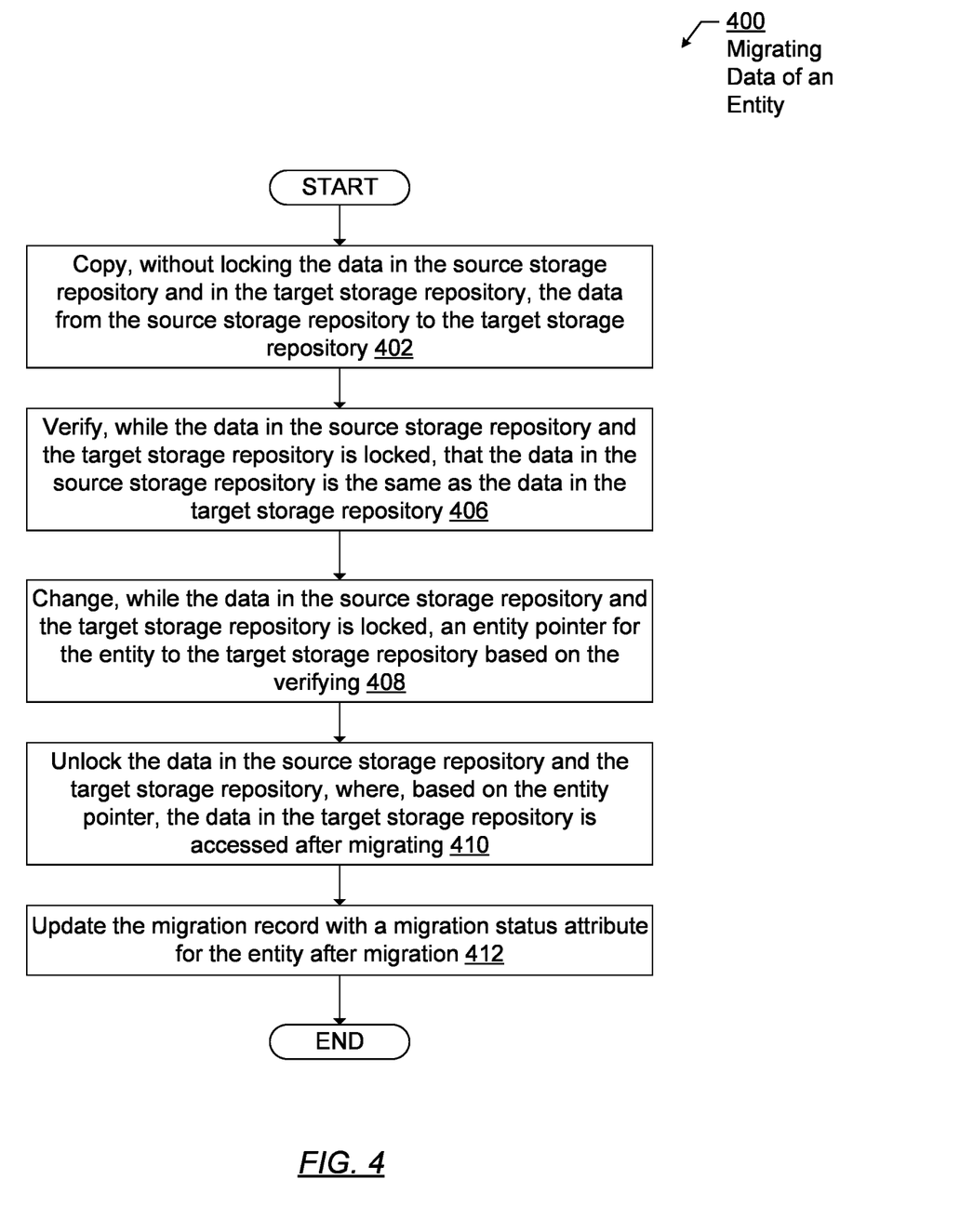
FIG. 4 shows a flowchart for migrating data of an entity in accordance with one or more embodiments.

FIG. 4 shows a flowchart for migrating data of an entity (400) in accordance with one or more embodiments. In Block 402, without locking the data in the source storage repository, the data in the source storage repository is copied from the source storage repository to the target storage repository. In one or more embodiments, the data of the entity is read from multiple tables and used to create a complex entity that is transformed based on the mapping to the target schema. Because the migration is performed on the entity level, if at least two conflicting tables having the same naming scheme does not overwrite the data.

For example, consider the scenario in which the entity uses a property value of x for one client software product and a property value of y for the same property for another client software product. In the example, each client software product on the source storage repository may use its own table while, on the target storage repository, the client software products share a data structure. Under a table based migration scheme, the property value of the second copied table overwrites the property value of the first copied table. Thus, if the property value of y is copied second, then the entity may have the property value of y rather than both the property value of x and the property value of y. However, by performing entity based migration, the system can detect when an entity has two different values for the same property value and adjust accordingly. For example, the entity based migration scheme detects the conflict and appends the client software identifier to the property value, thereby preventing the overwrite and avoiding data loss. The updating of names or the consideration of naming schemes across multiple tables is a creation of a complex entity. Namely, the complex entity avoids conflicting data problems for different software products.

By not locking data in the source storage repository and the target data repository, the overall system is available for access to the entity being copied. Namely, the entity for whose data is copied, does not have downtime in which users associated with the entity cannot use the client software. During this time, new data may be stored in the source storage repository and updates may be made to the source storage repository, which may or may not be propagated during the copying.

In one or more embodiments, the copying of data from the source storage repository and the storing of data in the target storage repository is performed using respective interfaces (i.e., source storage interface, target storage interface). Further, the copying is performed as a stream such that as data is read from the source storage repository, the data is written to the target storage repository. The data is not stored in an intermediate storage.

Figure 5:
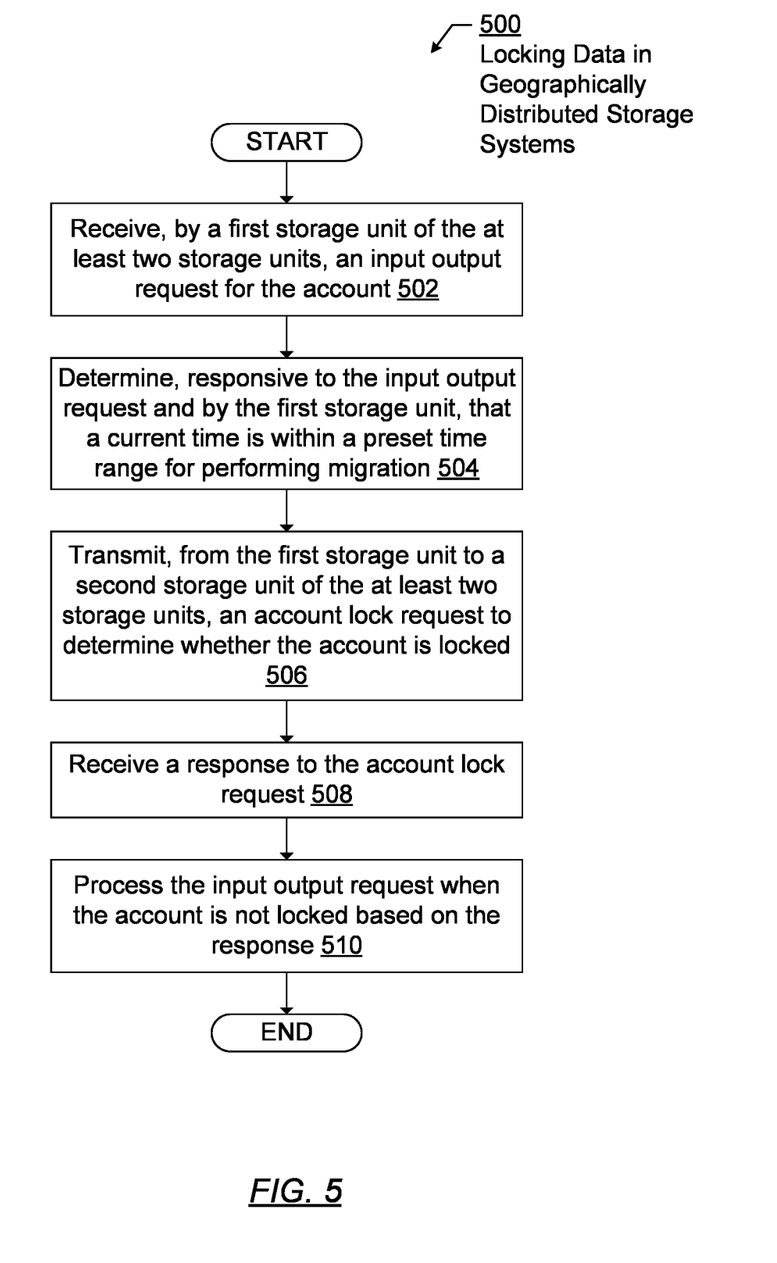
FIG. 5 shows a flowchart for locking data in accordance with one or more embodiments.

After the copying of the data is deemed complete, both the entity's data in the source storage repository and the target storage repository is locked. When locked, no additional updates may be made to the entity's data. For example, data may not be added, deleted, or modified in the account of the entity. FIG. 5 shows a flowchart for locking the data when the source storage repository has geographically distributed storage units.

In some embodiments, the system waits for a leading buffer time before proceeding. The leading buffer time is the time to allow any inflight updates to the data in the source storage repository to be made. For example, consider the scenario in which source storage repository is a geographically distributed repository. An update in one location may need to be copied to each other location so that the source storage repository is internally consistent. The leading buffer time is the time to complete the copying internally within the source storage repository, or to perform instructions being processed through the interfaces. For example, the leading buffer time may be a few milliseconds or even a second. After the leading buffer time elapses, the system proceeds to Block 406.

In Block 406, while the data in the source storage repository and the target storage repository is locked, a verification is performed that the data in the source storage repository is the same as the data in the target storage repository. The verification confirms that data loss did not occur during the copying. The verification may also confirm that the data of the entity was not updated when the data was unlocked.

Data in the source storage repository is transformed according to the target storage schema of the target storage repository and compared against the data for the entity in the target storage repository. If the data of the entity is not the same in both storage repositories, then the migration service may perform resolution handling. The resolution handling may be to mark the migration status as failed in the migration record. If the migration status is marked as failed, one or more retries may be performed. In another example, resolution handling may be to copy or correct the missing or incorrect data in the target storage repository.

The process of copying the data without locking and then verifying the copying process when locked provides for an emphasis on limiting failed customer interactions over reperforming migration of the entity. Overtime, the system assumes that the entity will have a downtime in which no updates are made to the data of the entity and the copying will be successful. If the number of retries exceeds a threshold, then, as a fallback, the data of the entity may be locked, and then copied or other fail stop measures may be taken.

Continuing with FIG. 4, in Block 408, while the data in the source storage repository and the target storage repository is locked, the entity pointer for the entity is changed to reference the target storage repository based on the verification. Successful verification results in the entity pointer being modified to reference the target storage repository. Unsuccessful verification or failed verification results in the entity pointer staying to reference the source storage repository. Updating the entity pointer is performed by the migration service sending a request to the entity adapter to change the entity pointer value for the entity to be the identifier of the target storage system instead of the source storage system.

In Block 410, the data in the source storage repository and the target storage repository is unlocked, where, based on the entity pointer, the data in the target storage repository is accessed after migrating. When the client software sends further requests to perform input output operations, the client software is directed to performing the input output operations with the target storage repository based on the update to the data. After unlocking, a subsequent verification of consistency between the source storage repository and the target storage repository may be performed. Further, in Block 412, the migration record is updated with a migration status attribute indicating that the migration of the entity successfully completed.

In some cases, the entity is a business entity with multiple users. In such embodiments, the following operations may be performed. The data of the business entity is copied and then the data of the employees and users of the business entity is copied. Once the data is copied for the business entity and employees, the various accounts of the business entities and employees may be locked. Specifically, the migration service concurrently locks an account of the business entity and the employees of the business entity. The verifying of Block 406 is then performed for both the data of the business entity and the employees while the account of the business entity and the employees of the business entity is concurrently locked. If successful, the entity pointers are transitioned together to reference the target storage repository and the accounts are unlocked.

Various different operations may be performed to handle locking of a geographically distributed source storage repository. In the geographically distributed source storage repository, the source storage repository spans multiple geographically distributed storage units. The geographically distributed storage systems includes at least two storage units that each include an account for the entity having a copy of the data. Thus, the geographically distributed storage units have replicated data for the entity. To perform the verification of Block 406, the account of the entity is locked on each of the at least two storage units in order to prevent updates to data of the entity in one of the storage units when the other is being used for verification.

As an initial matter, locking an account may include a timeout whereby the account is automatically unlocked at a certain time. For example, the account may be locked on a first storage unit of the at least two storage units, and then the first storage unit may notify each other storage unit of the at least two storage units that the account is locked. The migration service may then wait for a predetermined time interval to elapse to verify the data in Block 406 (above). The predetermined time interval is an elapse time to confirm that the account is locked on each of the at least two storage units. Thus, when an account is locked at a first storage unit, the locking is propagated to the other storage units of the storage repository. However, waiting the amount of time may cause undesirable delay in which failed customer interactions occur (i.e., the user sees an error or the system appears unduly slow). In some embodiments, if the verification of Block 406 fails, then the migration for the particular entity may be aborted. The migration may then be retried at a later point in time.

Another technique is described in FIG. 5. FIG. 5 shows a flowchart for locking data in geographically distributed storage units (500) in accordance with one or more embodiments. In Block 502, a first storage unit of the at least two storage units receives an input output request for the account. For example, the first storage unit may receive a request from client software.

Responsive to the input output request and by the first storage unit, the first storage unit determined that a current time is within a preset time range for performing migration in Block 504. The migration service may only perform migrations at certain times. Thus, outside of the time range, the various storage units may operate as normal. Within the time range, the various storage units perform the following operations.

In Block 506, the first storage unit transmits to the second storage unit of the at least two storage units, an account lock request to determine whether the account is locked. One of the storage units may be denoted as the lead storage unit for migration. In such a scenario, for each input output request during the preset time range, the other storage units send the account lock request.

In Block 508, a response is received to the account lock request. The response indicates whether or not the account is locked. The input output request is processed when the account is not locked based on the response in Block 510. If the response is that the account is not locked, then the input output request is processed. If the response indicates that the input output request is locked, then the first storage unit may respond with a failed processing. The user or the client software may be prompted to retry the request. If only the client software is prompted to retry the request, then the user only sees a slightly higher latency in using the client software.

Generally, the time to verify an account is only a few microseconds, resulting in a minimal time in which the account is locked. Thus, one or more embodiments minimize failed customer interactions.

Figure 6:
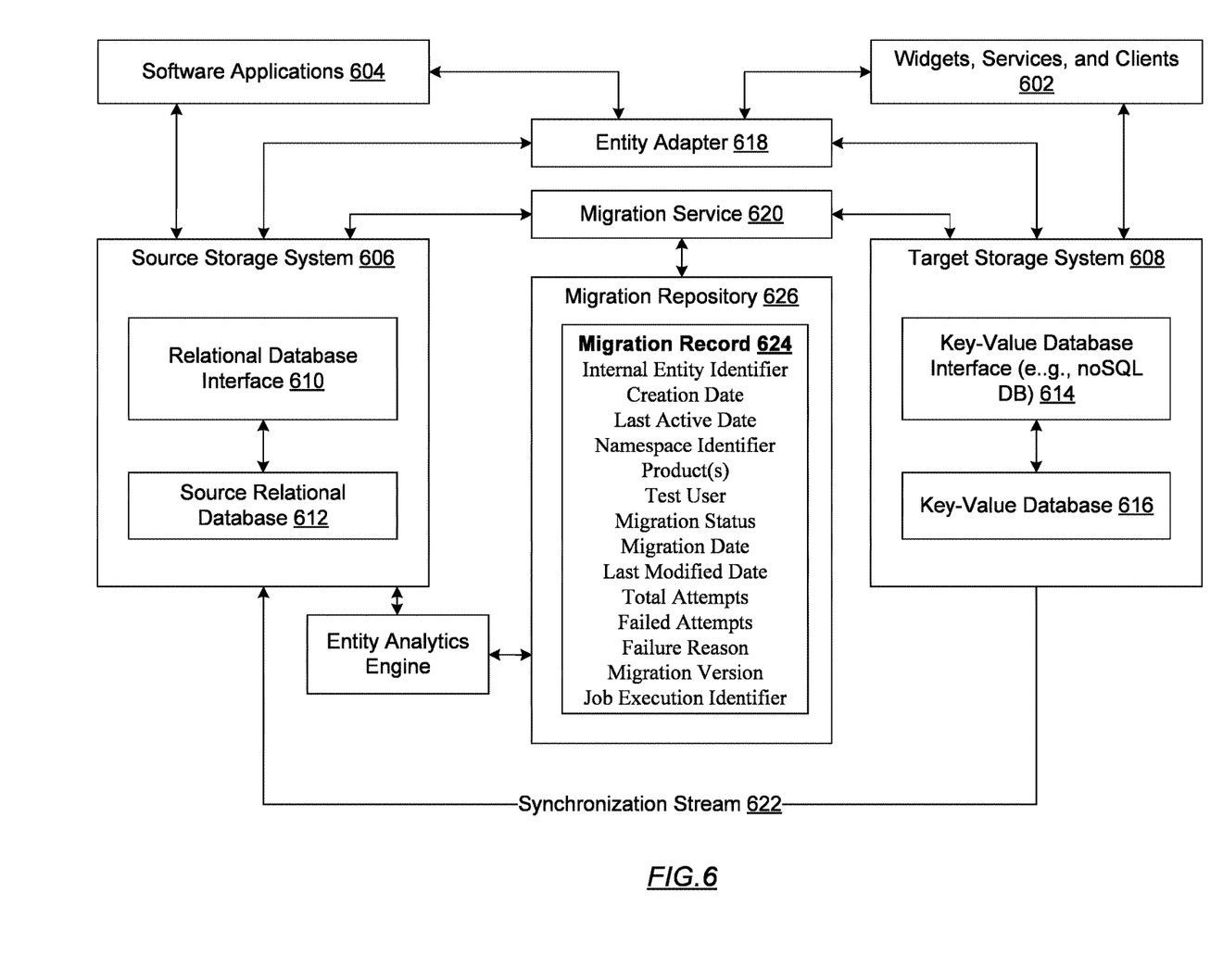
FIG. 6 shows an example in accordance with one or more embodiments.

FIG. 6 shows an example in accordance with one or more embodiments. Many software companies are moving towards a micro services based architecture with widgets, services, and clients (602) from existing monolithic software applications (604). One part of the change is to migrate the user serving data from the existing monolith service. The problem is more complex when the when the migration involves a completely different database technology stack. For example, the source storage system (606) is a relational database (e.g., SQL) (612) with a relational database interface while the target storage system (608) is a key-value database (616) with a key-value database interface (614) (e.g., NoSQL).

The scale may involves migrating multiple hundred million of entity's data which is active across different time zones in multiple different regions across the world. A goal is to have a solution that has minimal to no impact to their users and also have the flexibility to do the migration in a controlled fashion. For example, multiple hundred million individual and company's account data should be migrated with minimal impact and no single migration approach. The migration should be in a controlled fashion with the ability to segment the migration into multiple phases targeting a specific cohort, such as based on the product offering type. Further, one or more embodiments have zero data loss and maintain the data integrity is paramount. In some cases, the existing monolith applications (604) and target state micro services (602) are enabled across multiple regions in active/active mode with eventual consistency which adds to the overall complexity of data migration.

At a high level, the migration service (618) reading the data from the source storage system (606) and performing a relational storage database (612) to key-value database (616) mapping. The data is added to the key-value database (616) and validated to confirm that the data matches across the target storage units. The account is locked, and the verification is performed. If successful, the entity pointer in the entity adapter (618) is switched to reference the target storage system (608). Once the account's data has been successfully migrated, any updates to the micro-service will be replicated back to the monolith using the NoSQL CDC streaming approach with the synchronization stream (622). Delayed verification and nightly verification jobs will be configured to detect any drift in the modified accounts in both the services.

The entity analytics engine (622) gathers entity attributes to perform the migration and stores the entity attributes in a migration record (624) in the migration repository (626). FIG. 6 shows example attributes. The internal entity identifier uniquely identifies the user profile. The creation date is the last time the user was successfully created. The last active date is the last time that the user was active. The namespace identifier is an identifier of which the user is associated. The product identifier identifies various software products. The test user indicates whether the user is a test user. The migration status is whether the entity is not migrated, migrated, failure, deleted, or skipped. The migration date is a date when the user profile was successfully migrated. The last modified date is the date that the last time the account is modified. The total attempts date is the number of times the migration is attempted while the failed attempts is the number of times that the migration failed. The migration version is used to override the old migration status and to reattempt the offline migration if the version is higher. The job execution identifier is an identifier of the job that performs the migration.

The migration service (620) uses the migration record (624) to separate entities into cohort and to track the performance of the migration.

One or more embodiments allow data movement in a live, customer-facing environment with runtime traffic. The migration service orchestrates the workflow and dependencies in a stateful manner. The migration framework schedules multiple jobs in parallel across multiple nodes to migrate the data. Each job can be configured to migrate a specific set of accounts and will have the ability to rate limit the migration process to reduce the impact to the existing services.

The migration framework allows data to be served accurately by the entity adapter throughout data movement. The entity adapter maintains the current storage system of every account. The clients' calls will be routed through this entity adapter to check for the account's current storage system and forward the request to the account's current storage system. As part of the overall migration workflow, the account is locked to disallow any updates during the migration, the lock will expire after a certain threshold to avoid any deadlocks in case of failures and also deals with the active-active regional issues by always routing the home check calls to a single source of truth region during the migration window. In one or more embodiments, the migration process supports rollback and roll forward. Further, the migration process allows qualitative metrics to be distilled on the progress of data movement and early detection and intervention of data divergence.

Figure 7A:
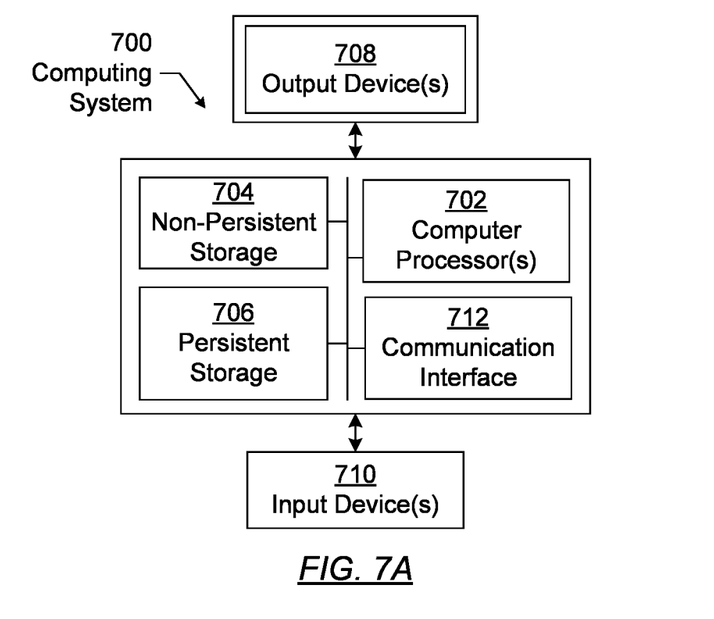
FIGS. 7A and 7B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing units (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the output devices (708) may include a display device, a printer, external storage, or any other output device. One or more of the output devices may be the same or different from the input device(s). The input and output device(s) may be locally or remotely connected to the computer processor(s) (702). Many different types of computing systems exist, and the aforementioned input and output device(s) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 7B:
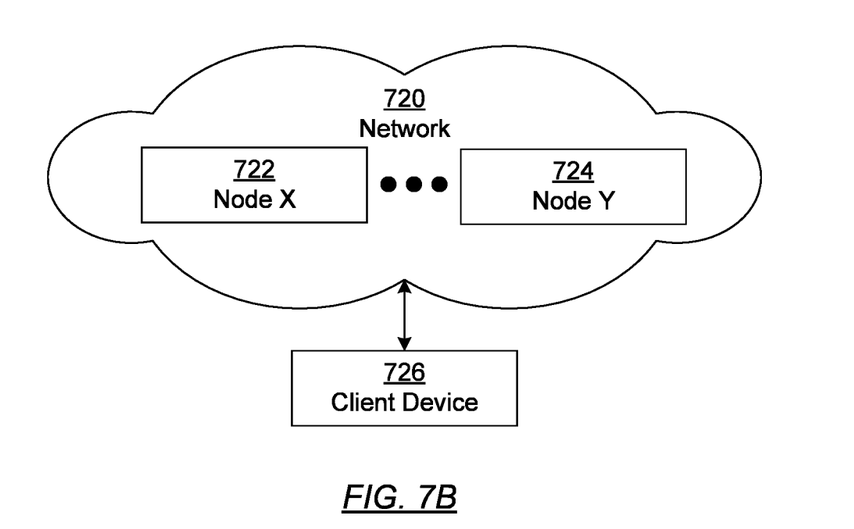

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722), node Y (724)) in the network (720) may be configured to provide services for a client device (726), including receiving requests and transmitting responses to the client device (726). For example, the nodes may be part of a cloud computing system. The client device (726) may be a computing system, such as the computing system shown in FIG. 7A. Further, the client device (726) may include and/or perform all or a portion of one or more embodiments of the invention.

The computing system of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   selecting, from a plurality of cohorts of entities, a cohort of entities for migration from a source storage repository to a target storage repository;
   obtaining a mapping between a source storage schema of the source storage repository to a target storage schema of the target storage repository; and
   migrating data for a plurality of entities in the cohort, wherein migrating the data of an entity of the plurality of entities comprises:
   copying, without locking the data in the source storage repository, the data from the source storage repository to the target storage repository,
   locking, after copying, the data in the source storage repository and the target storage repository, wherein locking comprises:
   locking an account on a first storage unit, and notifying a second storage unit that the account is locked,
waiting for a predetermined time interval to verify the data, wherein the predetermined time interval is an elapse time to confirm that the account is locked on the second storage unit,
verifying, while the data in the source storage repository and the target storage repository is locked, that the data in the source storage repository is the same as the data in the target storage repository,
changing, while the data in the source storage repository and the target storage repository is locked, an entity pointer for the entity to the target storage repository based on the verifying, and
unlocking the data in the source storage repository and the target storage repository,
wherein, based on the entity pointer, the data in the target storage repository is accessed after migrating.

2. The method of claim 1, further comprising:
for each entity of at least a subset of entities having data in the source storage repository:
gathering a plurality of usage attributes describing usage of the source storage repository by the entity; and
storing the plurality of usage attributes in migration record for the entity.

3. The method of claim 2, further comprising:
partitioning the at least the subset of entities into the plurality of cohorts based on the migration record of each of the at least the subset of entities.

4. The method of claim 3, wherein the partitioning uses at least two of the plurality of usage attributes in the migration record for the entity.

5. The method of claim 2, further comprising:
updating the migration record with a migration status attribute for the entity after migration.

6. The method of claim 2, wherein the migration record comprises an internal entity identifier of the entity and omits personally identifiable information for the entity.

7. The method of claim 1, wherein:
the entity is a business entity,
copying the data comprises:
copying the data of the business entity,
copying the data of a plurality of employees of the business entity, and migrating the data further comprises:
concurrently locking an account of the business entity and the plurality of employees of the business entity, wherein the verifying is performed for both the data of the business entity and the plurality of employees while the account of the business entity and the plurality of employees of the business entity is concurrently locked.

8. The method of claim 1, wherein the source storage repository is on a plurality of geographically distributed storage units, the plurality of geographically distributed storage units comprising at least two storage units each comprising an account for the entity comprising a copy of the data, and wherein migrating the data of the entity further comprises:
locking the account on each of the at least two storage units.

9. A method, comprising:
selecting, from a plurality of cohorts of entities, a cohort of entities for migration from a source storage repository to a target storage repository;
obtaining a mapping between a source storage schema of the source storage repository to a target storage schema of the target storage repository;
migrating data for a plurality of entities in the cohort, wherein migrating the data of an entity of the plurality of entities comprises:
copying, without locking the data in the source storage repository, the data from the source storage repository to the target storage repository,
locking, after copying, the data in the source storage repository and the target storage repository,
verifying, while the data in the source storage repository and the target storage repository is locked, that the data in the source storage repository is the same as the data in the target storage repository,
changing, while the data in the source storage repository and the target storage repository is locked, an entity pointer for the entity to the target storage repository based on the verifying, and
unlocking the data in the source storage repository and the target storage repository,
wherein, based on the entity pointer, the data in the target storage repository is accessed after migrating;
receiving, by a first storage unit, an input output request for an account;
determining, responsive to the input output request and by the first storage unit, that a current time is within a preset time range for performing migration;
transmitting, from the first storage unit to a second storage unit, an account lock request to determine whether the account is locked;
receiving a response to the account lock request; and
processing the input output request when the account is not locked based on the response.

10. The method of claim 8, wherein migrating the data of the entity further comprises:
locking the data on each of the at least two storage units; and
waiting, after locking the account, a leading buffer time to verify the account.

11. A method comprising:
selecting, from a plurality of cohorts of entities, a cohort of entities for migration from a source storage repository to a target storage repository;
obtaining a mapping between a source storage schema of the source storage repository to a target storage schema of the target storage repository; and
migrating data for a plurality of entities in the cohort, wherein migrating the data of an entity of the plurality of entities comprises:
copying, without locking the data in the source storage repository, the data from the source storage repository to the target storage repository,
locking, after copying and prior to verifying the data, the data in the source storage repository and the target storage repository,
waiting, after locking the data, a leading buffer time to verify the data,
verifying, while the data in the source storage repository and the target storage repository is locked, that the data in the source storage repository is the same as the data in the target storage repository,
changing, while the data in the source storage repository and the target storage repository is locked, an entity pointer for the entity to the target storage repository based on the verifying, and unlocking the data in the source storage repository and the target storage repository, wherein, based on the entity pointer, the data in the target storage repository is accessed after migrating.

12. The method of claim 1, wherein migrating the data of the entity further comprises:
  performing, after unlocking the data, a second stage verification that the data in the source storage repository is the same as the data in the target storage repository.

13. The method of claim 1, further comprising:
  after migrating the data of an entity, transmitting a synchronization stream comprising updates to the target storage repository from the target storage repository to the source storage repository.

14. The method of claim 1, further comprising:
  generating a complex entity spanning a plurality of tables of the source storage repository, the plurality of tables comprising at least two conflicting tables; and
  copying the complex entity into the target storage repository.

15. A system comprising:
  a migration repository;
  a computer processor; and
  a migration service for executing on the computer processor, the migration service comprising:
    a scheduler for:
      selecting, from a plurality of cohorts of entities, a cohort of entities for migration from a source storage repository to a target storage repository, and
      scheduling a job to migrate the cohort, and
    a job manager for executing the job, wherein executing the job comprises:
      obtaining a mapping between a source storage schema of the source storage repository to a target storage schema of the target storage repository; and
      migrating data for a plurality of entities in the cohort, wherein migrating the data of an entity of the plurality of entities comprises:
        copying, without locking the data in the source storage repository, the data from the source storage repository to the target storage repository,
        locking, after copying and prior to verifying the data, the source storage repository and the target storage repository,
        waiting, after locking the data, a leading buffer time to verify the data,
        verifying, while the data in the source storage repository and the target storage repository is locked, that the data in the source storage repository is the same as the data in the target storage repository,
        changing, while the data in the source storage repository and the target storage repository is locked, an entity pointer for the entity to the target storage repository based on the verifying, and
        unlocking the data in the source storage repository and the target storage repository, wherein, based on the entity pointer, the data in the target storage repository is accessed after migrating.

16. The system of claim 15, wherein the migration service further comprises:
  an entity analytics engine for performing:
    for each entity of at least a subset of entities having data in the source storage repository:
      gathering a plurality of usage attributes describing usage of the source storage repository by the entity; and
      storing the plurality of usage attributes in migration record for the entity.

17. The system of claim 16, wherein the migration service further comprises:
  a cohort generator for partitioning the at least the subset of entities into the plurality of cohorts based on the migration record of each of the at least the subset of entities.

18. A method comprising:
  partitioning a plurality of entities into a plurality of cohorts; and
  migrating each cohort of the plurality of cohorts individually, wherein migrating a cohort comprises migrating data for the plurality of entities in the cohort, wherein migrating the data of an entity of the plurality of entities comprises:
    copying, without locking the data in a source storage repository, the data from the source storage repository to a target storage repository,
    locking, after copying and prior to verifying the data, the source storage repository and the target storage repository,
    waiting, after locking the data, a leading buffer time to verify the data,
    verifying, while the data in the source storage repository and the target storage repository is locked, that the data in the source storage repository is the same as the data in the target storage repository,
    changing, while the data in the source storage repository and the target storage repository is locked, an entity pointer for the entity to the target storage repository based on the verifying, and
    unlocking the data in the source storage repository and the target storage repository, wherein, based on the entity pointer, the data in the target storage repository is accessed after migrating.

19. The method of claim 18, further comprising:
  for each entity of at least a subset of entities having data in the source storage repository:
    gathering a plurality of usage attributes describing usage of the source storage repository by the entity; and
    storing the plurality of usage attributes in migration record for the entity.

* * * * *